United States Patent [19]

Kwech

[11] Patent Number: 4,822,238

[45] Date of Patent: Apr. 18, 1989

[54] ROBOTIC ARM

[75] Inventor: Horst Kwech, Lake Bluff, Ill.

[73] Assignee: Westinghouse Electric Corp., Pittsburgh, Pa.

[21] Appl. No.: 97,264

[22] Filed: Sep. 17, 1987

Related U.S. Application Data

[63] Continuation of Ser. No. 876,018, Jun. 19, 1986, abandoned.

[51] Int. Cl.⁴ ............................. B25J 21/00; B25J 9/06
[52] U.S. Cl. ......................................... 414/730; 414/3; 414/8; 414/735; 901/15; 901/23; 901/50
[58] Field of Search .................... 901/14, 15, 18, 23, 901/24, 49, 50, 17, 1, 28, 29; 414/1, 3, 4, 7, 8, 744 A, 744 R, 718, 729, 730, 732, 735, 909; 74/768; 165/11.2

[56] References Cited

U.S. PATENT DOCUMENTS

| | | | |
|---|---|---|---|
| 3,047,167 | 7/1962 | Rose | 901/15 X |
| 3,066,805 | 12/1962 | Sullivan | 901/15 X |
| 3,247,978 | 4/1966 | Neumeier | 414/735 |
| 3,282,442 | 11/1966 | Biggley et al. | 414/7 |
| 3,451,224 | 6/1969 | Colechia et al. | 901/15 X |
| 3,589,134 | 6/1971 | Hackmann et al. | 414/3 X |
| 3,780,571 | 12/1973 | Wiesener | 901/15 X |
| 4,062,455 | 12/1977 | Flatau | 414/4 X |
| 4,068,536 | 1/1978 | Stackhouse | 74/417 |
| 4,163,183 | 7/1979 | Engelberger et al. | 318/568 |
| 4,169,758 | 10/1979 | Blackstone et al. | 901/17 X |
| 4,188,166 | 2/1980 | Moreau | 901/15 X |
| 4,283,165 | 8/1981 | Vertut | 901/1 X |
| 4,308,584 | 12/1981 | Arai | 414/730 X |
| 4,311,556 | 1/1982 | Iwamoto et al. | 901/17 X |
| 4,368,913 | 1/1983 | Brockmann et al. | 901/37 X |
| 4,493,598 | 1/1985 | Glachet et al. | 414/7 X |
| 4,501,522 | 2/1985 | Causer et al. | 414/4 |
| 4,523,884 | 6/1985 | Clement et al. | 414/735 X |
| 4,534,697 | 8/1985 | Poncet | 414/7 X |
| 4,561,816 | 12/1985 | Dingess | 414/4 |
| 4,566,843 | 1/1986 | Iwatsuka et al. | 414/680 |
| 4,621,965 | 11/1986 | Wilcock | 414/7 |
| 4,638,667 | 1/1987 | Zimmer et al. | 414/8 X |
| 4,662,814 | 5/1987 | Suzuki et al. | 901/15 X |
| 4,673,027 | 6/1987 | Vermaat | 901/15 X |
| 4,696,612 | 9/1987 | Germond et al. | 414/8 |
| 4,708,578 | 11/1987 | Richter | 901/15 X |

FOREIGN PATENT DOCUMENTS

| | | | |
|---|---|---|---|
| 2919120 | 11/1980 | Fed. Rep. of Germany | 74/768 |
| 3034912 | 4/1981 | Fed. Rep. of Germany | 414/735 |
| 2085185 | 12/1971 | France | 414/8 |
| 751615 | 7/1980 | U.S.S.R. | 414/3 |

OTHER PUBLICATIONS

Application of T. A. Colimitra, Ser. No. 758,931, filed 7/25/85, assigned to Westinghouse Electric Corp., assigned to Art Unit 352.

Primary Examiner—Robert J. Spar
Assistant Examiner—P. McCoy Smith

[57] ABSTRACT

A robotic arm positionable within a nuclear vessel by access through a small diameter opening and having a mounting tube supported within the vessel and mounting a plurality of arm sections for movement lengthwise of the mounting tube as well as for movement out of a window provided in the wall of the mounting tube. An end effector, such as a grinding head or welding element, at an operating end of the robotic arm, can be located and operated within the nuclear vessel through movement derived from six different axes of motion provided by mounting and drive connections between arm sections of the robotic arm. The movements are achieved by operation of remotely-controllable servo motors, all of which are mounted at a control end of the robotic arm to be outside the nuclear vessel.

20 Claims, 8 Drawing Sheets

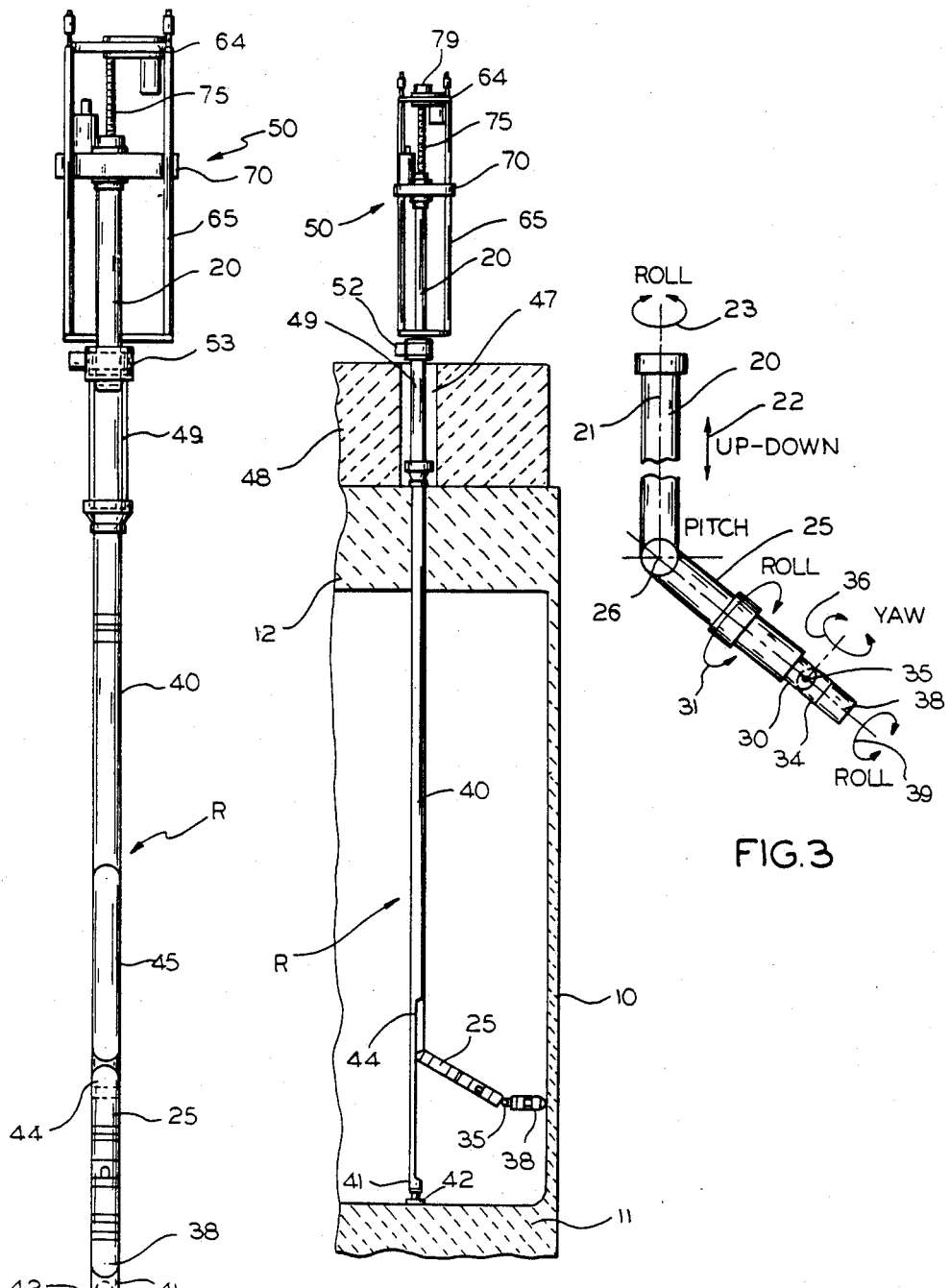

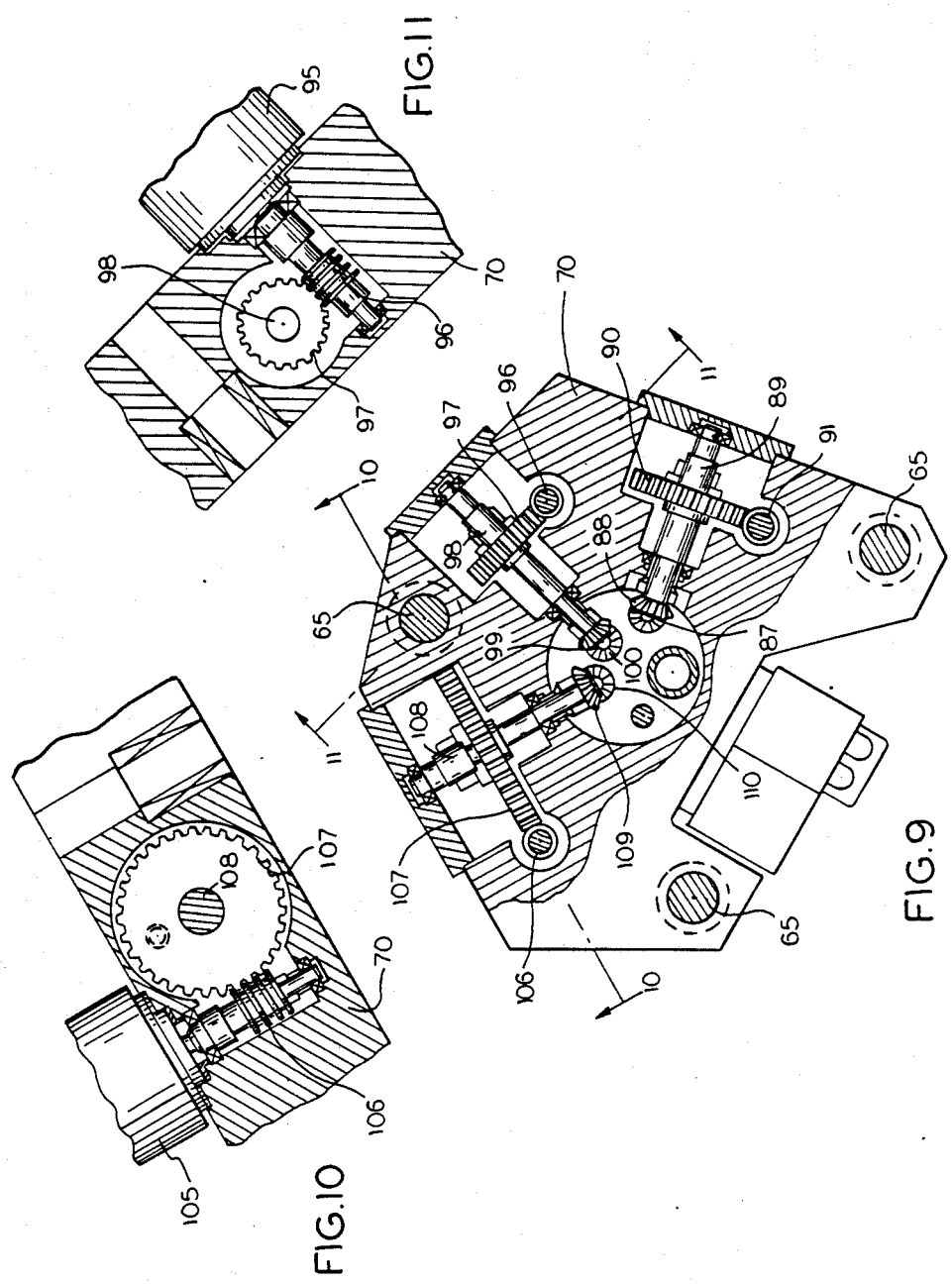

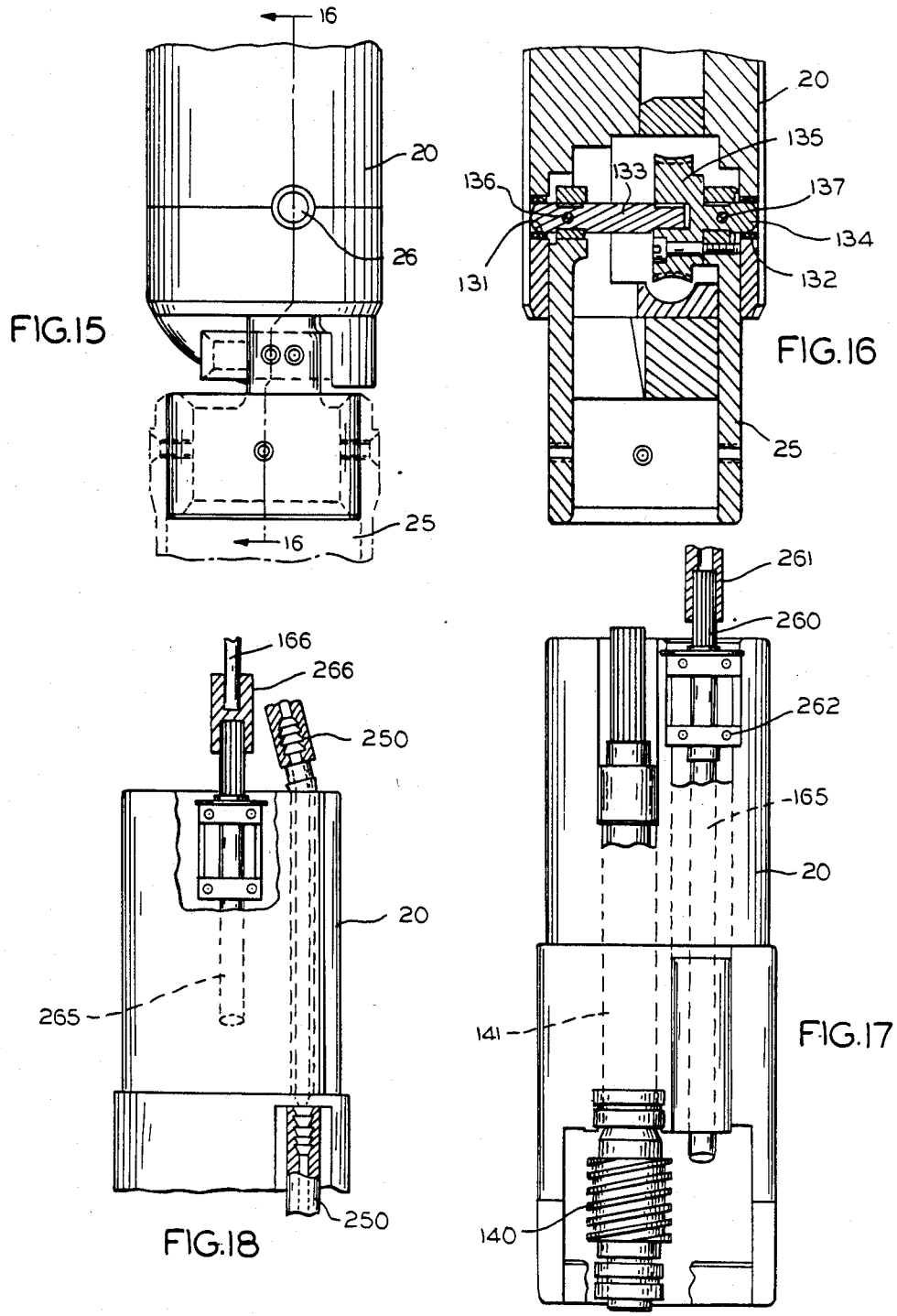

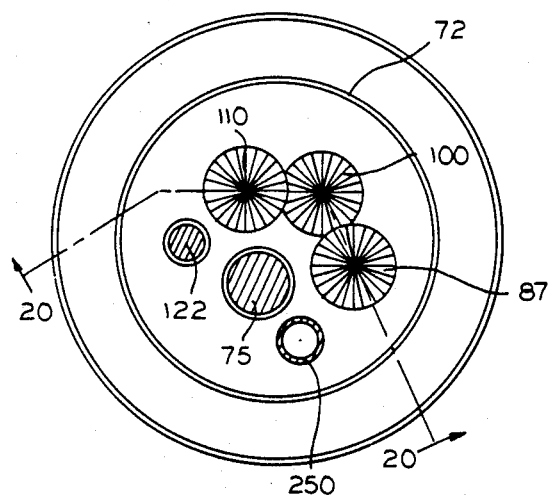
FIG.19
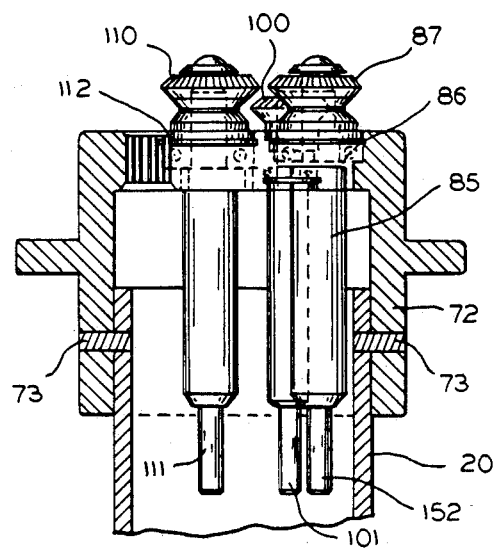
FIG.20
FIG.21

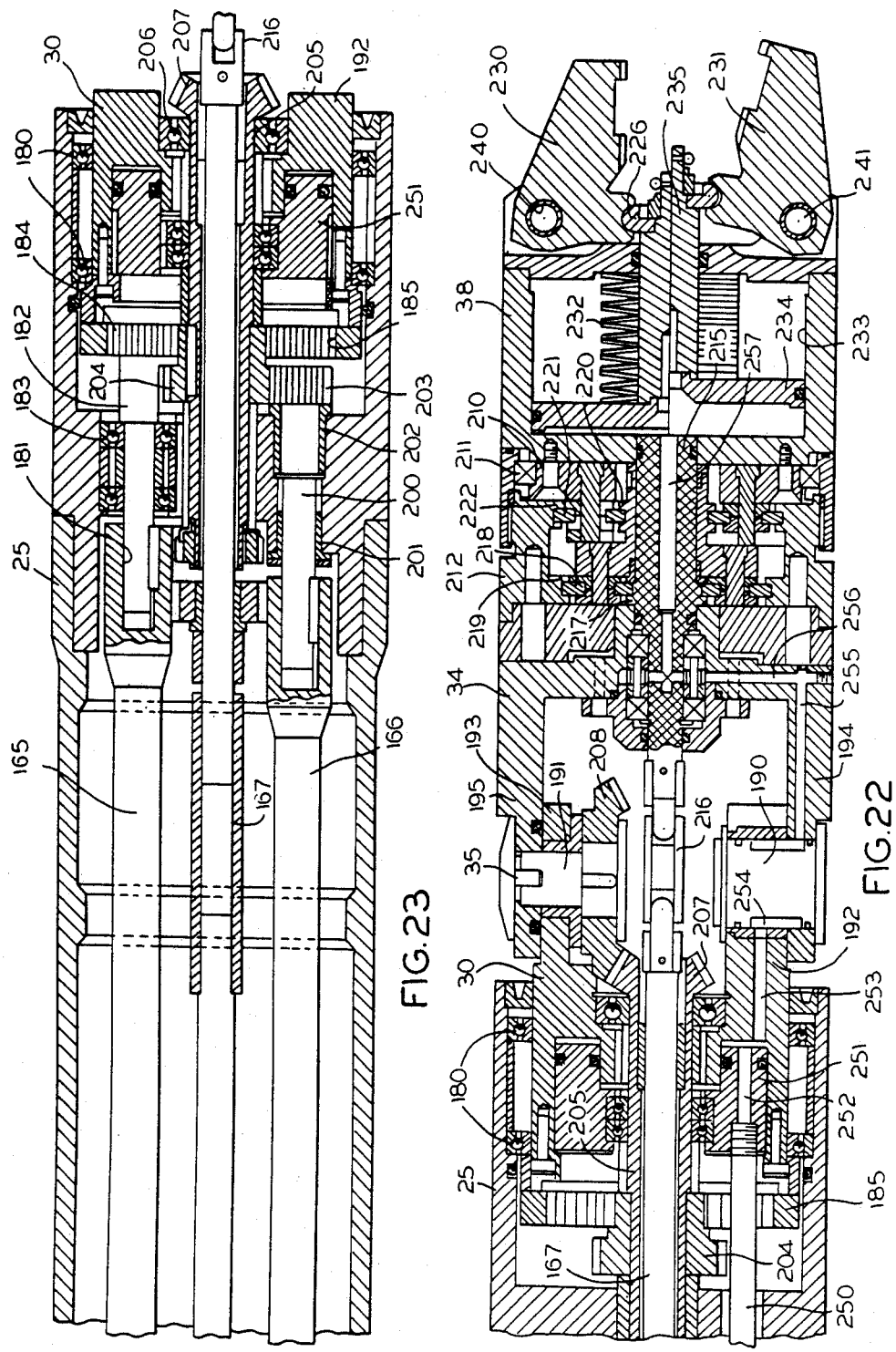

ROBOTIC ARM

The invention described herein was made in the course of, or under, Subcontract Number AX681866 with the United States Department of Energy.

This application is a continuation of application Ser. No. 876,018, filed June 19, 1986, now abandoned.

BACKGROUND OF THE INVENTION

1. Field of the Invention:

The invention generally relates to a robotic arm and, more particularly, to a remotely controllable robotic arm which provides work access to the interior of a nuclear vessel through a small diameter opening thereto and wherein six axes of motion are powered by servo motors outside of the nuclear vessel to be remote from a hostile environment within the nuclear vessel.

2. Description of the Prior Art:

In performing maintenance on a nuclear vessel, such as a large tank, it may be necessary to perform operations within the vessel, such as grinding and welding. One way to achieve access to the interior of the nuclear vessel has been to cut a large diameter hole in the wall thereof to permit man entry, with this being a time-consuming operation and exposing service personnel to a hostile environment. It has also been known to insert a tool-holding device through a tube at the top of the vessel and operate the device through a limited number of axes of motion manually by an operator. The operator is positioned at the top of the vessel and sights the tool through a mirror system and causes motion thereof by operation of cranks connected to cables.

Industrial robots are well known commercially-available structures. However, such robots have not had the desired axes of remotely-controlled motion, nor the size to enable insertion within a relatively small diameter hole at the top of a nuclear vessel to perform work operations within the nuclear vessel.

SUMMARY OF THE INVENTION

The present invention relates to a robotic arm with a plurality of arm sections arranged generally in end-to-end relation, with an arm section at an operating end releasably carrying an end effector for performing work operations and with the robotic arm having a plurality of axes of motion including a plurality of roll axes as well as a pitch axis and a yaw axis of motion for desired movement and positioning of an end effector.

More particularly, the present invention relates to a robotic arm as defined in the preceding paragraph which is insertable within a nuclear vessel through a small diameter opening and with movements about said plurality of axes of motion being achieved by remotely-operable drive motors located outside of the nuclear vessel and having drive connections to gear means between arm sections to achieve movement about said axes of motion.

An object of the invention is to provide a robotic arm having a plurality of arm sections comprising a first arm section, means for moving said first arm section along a first axis extending lengthwise thereof, means for rotating said first arm section about said first axis which constitutes a first roll axis, a second arm section, means pivotally interconnecting said first and second arm sections for pivoting of the second arm section about a pitch axis, a third arm section, means rotatably interconnecting said second and third arm sections for rotation of the third arm section about a second roll axis extending lengthwise of the second and third arm sections, a fourth arm section, means pivotally interconnecting said fourth arm section to the third arm section for pivoting of the fourth arm section about a yaw axis extending transversely to said third roll axis, a fifth arm section having means for holding an end effector, means interconnecting said fourth and fifth arm sections for rotation about a third roll axis extending lengthwise of the fourth arm section, and selectively operable drive means for achieving movement along or about one or more of said axes.

Still another object of the invention is to provide a robotic arm for work access to the interior of a nuclear vessel through a small diameter opening thereto comprising, a torque housing mountable onto the nuclear vessel externally of said opening, a mounting tube extended through said torque housing and of a length to extend into and adjacent the bottom of the nuclear vessel, a plurality of movably interconnected arm sections movably mounted within the mounting tube, said mounting tube having an opening in the wall thereof defining a window through which a plurality of said arm sections can be extended toward a wall of the nuclear vessel, a mounting frame rotatably supported by the torque housing, means connecting an upper end of the mounting tube to said mounting frame, a gearbox carried by said mounting frame at a location above the upper end of the mounting tube, a first of said arm sections extending above the upper end of the mounting tube, means connecting an upper end of said first arm section to said gearbox, means mounting said gearbox for movement longitudinally of the mounting frame, drive means connected between said mounting frame and gearbox for moving said gearbox and first arm section lengthwise of the mounting frame and the mounting tube along a first axis of motion, drive means for rotating said mounting frame including a motor supported by said torque housing for rotating the mounting tube and first arm section about a second axis of motion, and gear means between said plurality of arm sections rotatable to cause movement of one arm section relative to another, a plurality of motors on said gearbox, and drive shafts from said motors to said gear means.

BRIEF DESCRIPTION OF THE DRAWINGS

The invention may be better understood, and further advantages and uses thereof are readily apparent, when considered in view of the following detailed description of an exemplary embodiment, taken with the accompanying drawing in which:

FIG. 1 is a front elevational view of the robotic arm;

FIG. 2 is a view, similar to FIG. 1, showing the robotic arm in side elevation in association with a nuclear vessel, with the operating end thereof disposed in a working position in the nuclear vessel;

FIG. 3 is a diagrammatic view illustrating the axes of motion of the robotic arm;

FIG. 9 is a partial sectional view, taken generally along the line 9—9 in FIG. 4;

FIG. 10 is a sectional view, taken generally along the line 10—10 in FIG. 9;

FIG. 11 is a sectional view, taken generally along the line 11—11 in FIG. 9;

FIG. 15 is a fragmentary, enlarged view of the robotic arm structure at the pivot axis of motion;

FIG. 16 is a sectional view, taken along line 16—16 in FIG. 15;

FIG. 17 is a view of the robotic arm structure at and immediately above the pivot axis of motion;

FIG. 18 is a fragmentary view showing additional structure associated with a part of the robotic arm shown in FIG. 17;

FIG. 19 is a top view of the miter gear housing, seen in part in FIG. 4;

FIG. 20 is a sectional view, taken generally along the line 20—20 in FIG. 19;

FIG. 21 is an elevational view, partly in section showing a drive motor for driving the robotic arm for movement about an axis of motion and showing a resolver connection thereto;

FIG. 22 is a transverse, central sectional view of the robotic arm at the operating end thereof and showing clamp structure for holding an end effector in both clamping and release position; and FIG. 23 is a sectional view of the structure shown at the left-hand end of FIG. 22 and with the structure seen at right angles to that shown in FIG. 22.

DESCRIPTION OF THE PREFERRED EMBODIMENT

Figure 4:
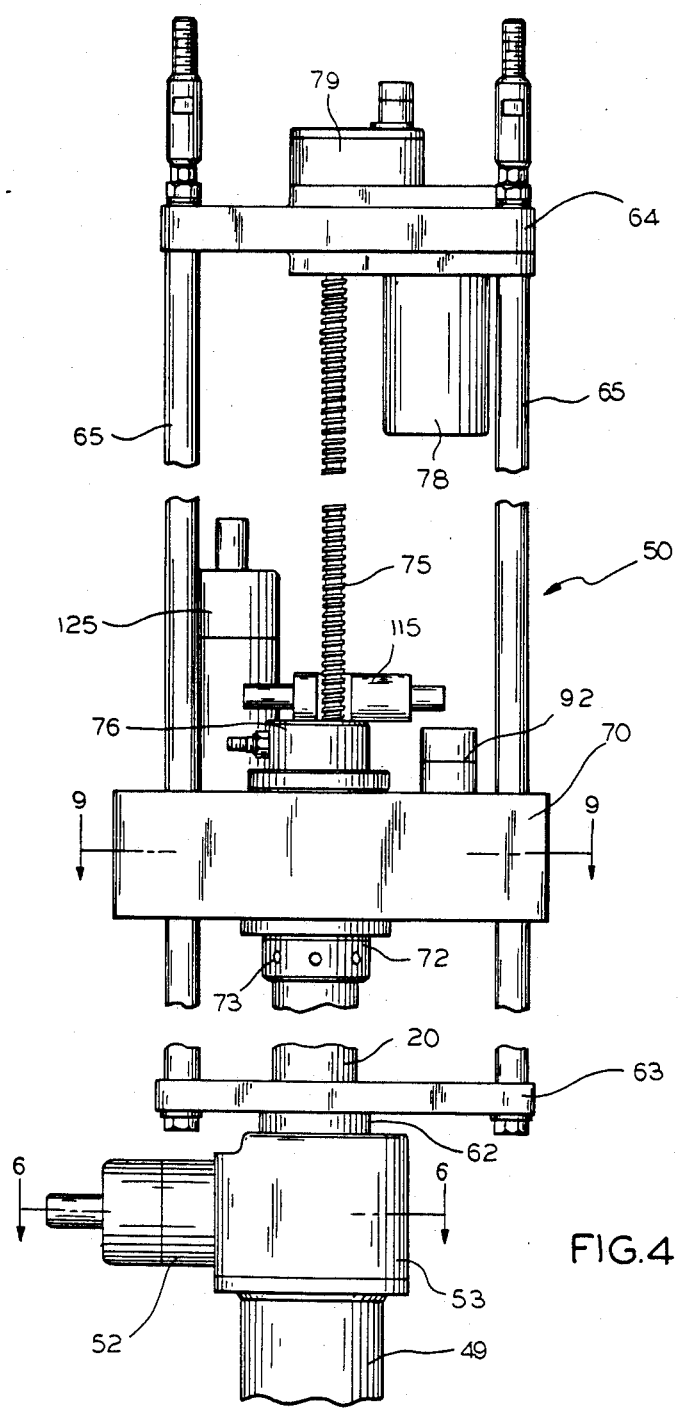
FIG. 4 is a fragmentary elevational view of the upper end of the robotic arm as seen in FIGS. 1 and 2 and on an enlarged scale.

The robotic arm is shown generally in FIGS. 1 and 2 and with the axes of motion being diagrammatically illustrated in FIG. 3. The robotic arm has particular utility for performing operations within a nuclear vessel which, as seen fragmentarily in FIG. 2, has a side wall 10, a bottom 11, and a top 12. The top 12 has a series of small diameter tubes extending therethrough providing relatively small diameter openings and the robotic arm, indicated generally at R, is accessed to the interior of the nuclear vessel by lengthwise insertion through one of the tubes.

Referring particularly to the diagrammatic view of FIG. 3, the robotic arm has a plurality of arm sections, including a first arm section 20 having lengthwise movement along a first axis 21, indicated by an arrow 22 and identified by the legend "UP-DOWN" and also having rotation about this first axis which defines a roll axis, the rotation being identified by the arrow 23.

A second arm section 25 is pivotally interconnected with the first arm section 20 for pivotal movement about a pitch axis 26. A third arm section 30 is rotatably interconnected with the second arm section 25 for rotation about a second roll axis and the rotation is indicated by the arrow 31. A fourth arm section 34 is pivotally connected to the third arm section 30 for pivotal movement about a yaw axis 35 and which is identified as an axis of motion by the arrow 36. A fifth arm section 38 is rotatably connected to the fourth arm section 34 for rotation about a third roll axis, with the rotation identified by the arrow 39. This fifth arm section defines an operating end for the robotic arm and has structure to be described for holding an end effector. A number of different operations may be required to be performed within the nuclear vessel, such as applying a chemical for crack detection, grinding, welding or marking.

The robotic arm has a mounting tube 40 of a length to extend upwardly beyond the top 12 of the nuclear vessel and to have a lower end 41 which can loosely engage with a pin 42 mounted to the inner surface of the nuclear vessel bottom 11 for guided rotational movement of the mounting tube. The mounting tube provides a guide for rotational and longitudinal movement of the first arm section 20 while permitting the remaining arm sections to extend outwardly thereof by pivotal movement up to 90° about the pitch axis 26 through a window 44 cut from the wall of the mounting tube. The pitch axis 26 extends transverse to the length of the mounting tube 40. The window 44 can be located along the length of the mounting tube 40, dependent upon the level at which an end effector is to perform work within the nuclear vessel. A second window location is shown at 45 in FIG. 1.

The robotic arm is shown in an operative position in FIG. 2 and extends through a tube in the top 12 of the nuclear vessel and through an opening 47 in a shield 48 above the top 12 of the nuclear vessel.

A torque housing 49 extends lengthwise of the opening 47 and has a lower end fixed nonrotatably to the top 12 of the nuclear vessel. The mounting tube 40 and the arm sections disposed therein pass through the torque housing 49 and are rotatable relative thereto.

A mounting frame, indicated generally at 50 (FIG. 4), is rotatable relative to the torque housing 49 about the roll axis identified by arrow 23 in FIG. 3 and the mounting tube 40 is fixed relative to the mounting frame for rotation therewith. Means for causing movement rotationally about the first roll axis comprises a drive motor 52 mounted on a housing 53, as seen in FIGS. 4 and 6-8. The drive motor 52 is a remotely-controllable servo motor and has a drive shaft connected to a rotatably-mounted shaft 54 having a worm 55 which meshes with a worm gear 56 on a shaft 57. The shaft 57 has a worm 58 which meshes with a worm gear 59 fixed to a hub 60 which receives an upper end of the mounting tube 40. The upper end of the mounting tube 40 is secured to the hub 60 by threaded fastening members 61. The upper end of the hub 60 has a flange 62 which is fixed to a lower plate 63 of the mounting frame 50.

The lower plate 63 has a generally triangular configuration, as does an upper plate 64 of the mounting frame. A series of guide rods 65 extend between the upper and lower plates and rigidly connect the upper and lower plates together.

The guide rods 65 mount a main gearbox 70 for movement lengthwise of the first axis 21. The main gearbox 70 has a miter gear housing 72 fixed to and extending from the lower end thereof and, as seen particularly in FIG. 20, an upper end of the first arm section 20 extends into the miter gear housing 72 and is secured thereto for rotation therewith by a series of threaded members 73. The first arm section 20 can be rotated about the first axis 21 by rotation of the mounting frame 50. Movement of the main gearbox 70 on the guide rods 65 causes the first arm section to move longitudinally of the first axis 21.

The movement of the main gearbox 70 longitudinally of the guide rods 65 is achieved by rotation of a ball screw 75 which coacts with a ball nut (not shown) in a conventional manner, with the ball nut being mounted in a ball nut housing 76 fixed to the upper side of the main gearbox 70. The ball screw 75 is selectively rotatable by a conventional worm gear drive mounted in the upper plate 64 of the mounting frame which is driven by a remotely controllable servo motor 78. A resolver 79, supported by the upper plate 64 provides a remote feedback with respect to motion lengthwise of the first axis 21.

Movement about a number of axes of motion and, particularly, the pitch axis 26 and the yaw axis 35, as well as the second and third roll axes is derived from remotely-controllable drive motors, in the form of servo motors, mounted to the main gearbox 70 at a control end of the robotic arm external of the nuclear vessel. The drive motors drive motion-transmitting shafts extending lengthwise of the arm sections to gear means which effect the movements about the axes of motion.

The pitch axis 26 is a third axis of motion. The upper end of a motion-transmitting shaft structure for causing movement about this axis is shown at 85 in FIG. 20, with the upper end being located within the miter gear housing 72 and rotatably supported by a bearing 86. A bevel gear 87 at the upper end thereof meshes with a bevel gear 88 on a shaft 89 having a worm gear 90 (FIG. 9) which meshes with a worm 91 driven by a remotely-controllable motor 92 (FIG. 4) which is mounted at the top of the main gearbox 70.

Rotation of the third arm section 30 relative to the second arm section 25 provides a second roll axis and constitutes a fourth axis of motion. Movement results from operation of a remotely-controllable drive motor. The drive motor 95 (FIG. 11) is a servo motor mounted on the top of the main gearbox 70 which drives a worm 96 engaging a worm gear 97 on a shaft 98. The shaft 98 has a bevel gear 99 at an end thereof meshing with a bevel gear 100 fixed to an upper end 101 of a motion-transmitting shaft which extends to gearing, to be described, between the second arm section 25 and the third arm section 30.

A remotely-controllable drive motor (servo motor) 105 mounted on the top of the main gearbox 70 drives a shaft having a worm 106 meshing with a worm gear 107 on a shaft 108. The shaft 108 has a bevel gear 109 which meshes with a bevel gear 110 fixed to an upper end 111 of a motion-transmitting shaft which extends to gearing between the third arm section 30 and the fourth arm section 34 to achieve pivoting about the yaw axis 35 which defines a fifth axis of motion. The upper ends 101 and 111 of the motion-transmitting shafts extending to the fourth and fifth axes of motion, respectively, are rotatably-mounted by bearings to the miter gear housing 72, as by bearing 112 for the upper end 111.

A drive motor (servo motor) 115 mounted to the upper side of the ball nut housing 76, as seen in FIG. 4 and also shown in FIG. 21, drives a shaft 116 having a gear mesh at 117 which drives a resolver shaft 118 and also rotates a sleeve 119 having a bevel gear 120 which meshes with a bevel gear 121 fixed to the upper end of a motion-transmitting shaft 122 (FIG. 19). The motion-transmitting shaft 122 extends to gearing between the fourth arm section 34 and the fifth arm section 38 to cause rotation about the third roll axis which constitutes a sixth axis of motion.

The drive motors for causing movement about the sixth axes of motion are at the control end of the robotic arm and not in the nuclear vessel. Each drive motor has a resolver providing a feedback, such as the resolver 79, previously referred to, for feedback of motion along the first axis of motion. Typical of the resolvers for the third, fourth and fifth axes of motion is a resolver 125 mounted to the top of the main gearbox 70.

With the structure thus far described, it is possible to achieve rotation of the mounting tube 40 and the robotic arm sections disposed therein, lengthwise movement of the arm sections relative to the mounting tube, and to extend the second, third, fourth and fifth arm sections outwardly of the mounting tube through the window 44 to place the operating end of the robotic arm in a desired location and to achieve movement thereof as a result of operation about six axes of motion.

Figures 5, 6, 7, 8:
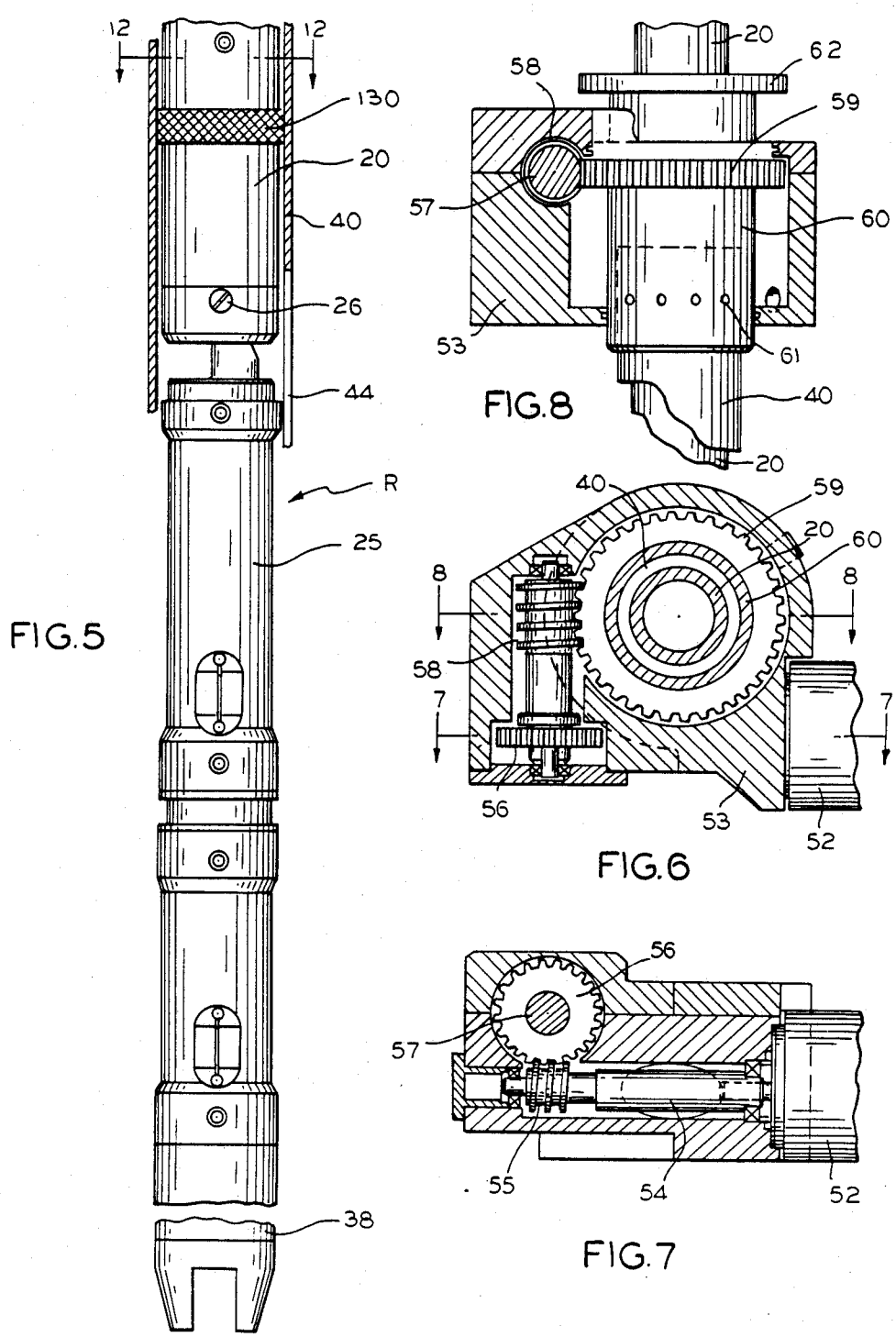
FIG. 5 is a fragmentary view of an intermediate portion of the robotic arm.
FIG. 6 is a transverse sectional view, taken generally along the line 6—6 in FIG. 4 and rotated 180°.
FIG. 7 is a sectional view, taken generally along the line 7—7 in FIG. 6.
FIG. 8 is a sectional view, taken generally along the line 8—8 in FIG. 6.

Referring to FIG. 5, the first arm section 20 is shown in association with a portion of the mounting tube 40. The first arm section 20 has spaced bearing members along the length thereof for guiding and support thereof within the mounting tube 40. One of these bearing members is shown at 130.

The structure for pitch axis 26 between the first arm section 20 and the second arm section 25 is shown particularly in FIGS. 15 and 16. The lower end of the first arm section 20 mounts a pair of bearings 131 and 132 which receive a drive pin 133 and a reduced diameter section 134 of a worm gear 135, respectively. The drive pin 133 and the reduced diameter section 134 are pinned by pins 136 and 137 to the wall of the second arm section 25 whereby rotation of the worm gear 135 results in pivoting of the second arm section 25 about the pitch axis 26. The lower end of the first arm section 20 is cut away to permit the pivoting movement of the second arm section 25 through 90° to a horizontal position.

Rotation is imparted to the worm gear 135 by a worm 140 (FIG. 17) which is mounted on a rotatable shaft 141 which, through connecting shaft sections (not shown) which extend upwardly through the tubular first arm section 20 connect to the upper end 85 of the motion-transmitting shaft shown in FIG. 20 whereby operation of the motor 92 results in pivoting of the second arm section 25 about the pitch axis 26.

Figure 12:
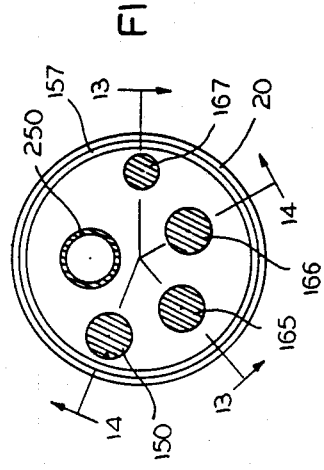
FIG. 12 is a transverse section, taken generally along the line 12—12 in FIG. 5.
Figure 13:
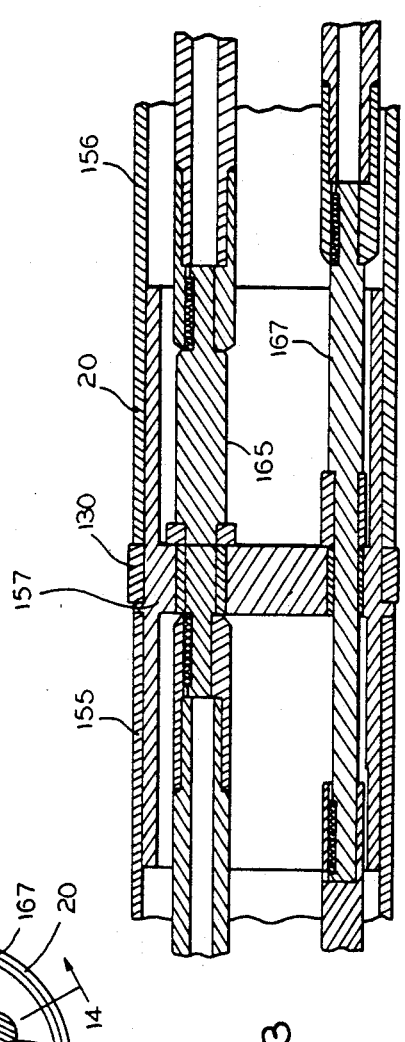
FIG. 13 is a sectional view, taken generally along the line 13—13 in FIG. 12.
Figure 14:
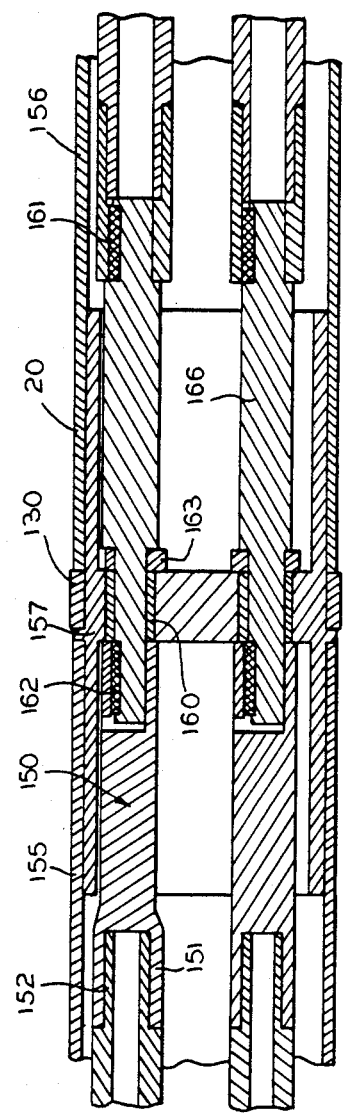
FIG. 14 is a sectional view, taken generally along the line 14—14 in FIG. 12.

The construction of the motion-transmitting shafts and the mounting thereof within the first arm section 20 is shown in FIGS. 12-14. A motion-transmitting shaft 150 transmits motion for movement about the third axis of motion, namely, the pitch axis 26, and is made of shaft sections, such as a shaft section 151 with a recessed end 152 to receive an adjacent shaft section 153. The first arm section 20 is formed from lengths of tubular members connected in end-to-end relation and, as seen in FIGS. 13 and 14, there is a pair of tubular members 155 and 156 with an interconnector 157 therebetween which mounts the previously-mentioned bearing 130 for guiding of the first arm section 20 within the mounting tube 40. A bushing 160, fitted within an opening of the interconnector 157, rotatably mounts the motion-transmitting shaft 150. The shaft sections are keyed together by keys 161 and 162 and downward thrust is resisted by a thrust bushing 163 engageable with the interconnector 157.

A similar motion-transmitting shaft 165 is for the fourth axis of motion and is of generally the same construction as the motion-transmitting shaft 150. A motion-transmitting shaft 166 for transmitting rotation for the fifth axis of motion is shown in FIG. 14 and is of generally the same construction as the shaft 150. A motion-transmitting shaft 167 is shown in FIG. 13 and is of generally the same construction as the shaft 150 and is for the purpose of transmitting rotation for causing movement about the sixth axis of motion.

The construction of the second through fifth arm sections and their interconnections is shown particularly in FIGS. 22 and 23. The third arm section 30 is rotatably-mounted within a recess at the end of the second arm section 25 by a pair of bearings 180. An end of the motion-transmitting shaft 165 interfits at 181 with a shaft 182 rotatably-supported by a bearing 183 and having a gear 184 which meshes with an interally-toothed annular gear 185 fixed to the arm section 30. Rotation of the drive motor 95 mounted on the main gearbox 70 externally of the nuclear vessel will result in rotation of the third arm section 30 relative to the second arm section 25 about the second roll axis identified by the second roll axis arrow 31.

The fifth axis of motion is pivotal movement of the fourth arm section 34 relative to the third arm section 30 about the yaw axis 35. The pivotal mounting therebetween is provided by a pair of stub shafts 190 and 191 which pivotally interconnect apertured ears 192 and 193 of the third arm section 30 to apertured ears 194 and 195, respectively, of the fourth arm section 34. Movement about the yaw axis is derived from rotation of the motion-transmitting shaft 166 which, as seen in FIG. 23, interfits with a shaft 200 supported by bushings 201 and 202 and which has a gear 203 meshing with a gear 204 fixed to a tubular member 205 surrounding the motion-transmitting shaft 167. The tubular member 205 is rotatably supported by a plurality of bearings, such as the bearing 206, and has a drive pinion 207 which meshes with a gear 208 fixed to the stub shaft 191. The stub shaft 191 is keyed to the apertured ear 195 of the fourth arm section 34. Operation of the drive motor 105 located at the main gearbox 70 causes rotation of the motion-transmitting shaft 166 to cause movement about the yaw axis 35 (the fifth axis of motion).

The sixth axis of motion is rotation about the third roll axis and is achieved by rotation of the fifth arm section 38 relative to the fourth arm section 34. The fifth arm section 38 has a planet carrier 210 fixed thereto. The planet carrier 210 is rotatably supported on the fourth arm section 34 by a bearing 211 within a ring gear member 212 fixed to the fourth arm section 34. The motion-transmitting shaft 167 is connected to a rotatable shaft 215 within fourth arm section 34 and fifth arm section 38 by a universal joint 216 which enables transmission of rotation, even though there is pivoting about the yaw axis 35. The shaft 215 has a first sun gear 217 thereon which meshes with planet gears 218 which mesh with a first internal ring gear 219 on the ring gear member 212. The planet gears 218 are rotatably mounted on a planet carrier having a second sun gear 220 which meshes with planet gears 221 carried by the previously-referred to planet carrier 210 and which mesh with a second internal ring gear 222 on the ring gear member 212. With the double planetary structure, there is a substantial reduction between the rotation of the motion-transmitting shaft 167 and the fifth arm section 38.

The fifth arm section 38 can releasably hold an end effector, such as a grinding head or a welding tool and, for this purpose, has a pair of fingers 230 and 231, with the finger 230 being shown in FIG. 22 in tool-gripping position and the finger 231 being shown in tool released position. The fingers 230 and 231 are urged to a gripping position, as shown for finger 230, by a spring 232 within a cylinder 233 in the fifth arm section 38 and which urges a piston 234 to the left. A piston rod 235 has an annular cam 226 fitted within a groove in the fingers 230 and 231 whereby movement of the piston rod 235 causes pivoting of the fingers about their respective pivots 240 and 241. The fingers are moved to the release position, as shown for finger 231, by movement of the piston 234 to the right against the action of the spring 232 by air supplied through an air line extending through the arm sections from a location above the nuclear vessel. The air line is shown at 250 in FIG. 19 and is also seen in FIG. 12 and FIG. 18.

The air line 250 extends into a fitting 251 in the fourth arm section 34 (FIG. 22) having a passage 252 which communicates with a passage 253 leading to a peripheral recess 254 in the stub shaft 190. The peripheral recess communicates with a passage 255 leading to a radial passage 256 in the fourth arm section 34 which communicates with a passage 257 internally of the shaft 215 opening to the left-hand end of the cylinder 233. Air under pressure delivered through the line 250 moves the piston 234 to the right against the spring 232 to release the fingers 230 and 231. Release of air pressure permits the spring 232 to move the fingers to tool-gripping position. The various passages extending from the air line 250 to the cylinder 233 are suitably sealed with O-rings.

The motion-transmitting shafts for the fourth through sixth axes of motion, namely the shafts 165, 166 and 167, must have flexibility at the third axis of motion, namely the pitch axis 26. Referring to FIG. 17, the motion-transmitting shaft 165 for the fourth axis of motion is shown as having a flex shaft section 260 with a spline connection at 261 to an adjacent shaft section, with the flex shaft section 260 permitting flexure about the pitch axis 26. The spline connection 261 permits change in the effective length of the shaft. A bearing support 262 is provided adjacent the spline connection. A similar flex shaft section 265 is shown for motion-transmitting shaft 166 for the fifth axis of motion and includes a spline coupling 266. There is a similar flex shaft section and spline connection (not shown) for the motion-transmitting shaft 167 as well as a flex shaft section within the second arm section 25 to enable a transition of the latter shaft between the off-center location shown in FIG. 12 and the central location shown in FIGS. 22 and 23.

The robotic arm disclosed herein enables the performance of various operations within a nuclear vessel by accessing a robotic arm through a small opening and without any cutting through the wall of the vessel. The effector performing the work operation can be moved as a result of motion about six different axes of motion, with all the control being obtained by operation of motors outside of the nuclear vessel. The connections to an end effector, such as the drive to a grinding head, can be extended through another opening in the top 12 of the nuclear vessel.

I claim as my invention:

1. A robotic system comprising a robotic arm for work access to the interior of a nuclear vessel and having an operating end for holding an end effector to perform a desired operation within the nuclear vessel and a control end positionable externally of the nuclear vessel comprising, a housing attachable to the nuclear vessel, a mounting frame rotatable on the housing externally of the nuclear vessel, a plurality of arm sections positioned generally in end-to-end relation including a first arm section extending through said housing and having a length to extend from within the nuclear vessel to said control end and having longitudinal movement lengthwise of said housing, said first arm section being connected to said mounting frame for rotation therewith, means on an arm section at the operating end of the robotic arm for holding an end effector, means mounting said arm sections to enable six axes of motion of the operating end of the robotic arm including said longitudinal movement of the first arm section with a plurality of said axes of motion being between arm sections disposed in the nuclear vessel during operation of the robotic arm, means between arm sections operable to effect said plurality of axes of motion, a plurality of motors at the control end of the robotic arm for positioning outside of the nuclear vessel for providing power to said means between arm sections for moving said arm sections to achieve said six axes of motion, means mounting at least one of said motors for said longitudinal movement with said first arm section, and drive trains between certain of said motors and said means between arm sections to cause movement about said plurality of axes of motion.

2. A robotic system as defined in claim 1 wherein said six axes of motion include longitudinal and rotational movement of the entire robotic arm, a third axis of motion to rotate the operating end of the robotic arm about an axis transverse to said longitudinal movement, a fourth axis of motion to roll said operating end about an axis extending generally lengthwise thereof, a fifth axis of motion to pivot the operating end about an axis transverse to said fourth axis of motion and a sixth axis of motion to rotate the operating end about an axis generally lengthwise thereof.

3. A robotic system for working access to the interior of a nuclear vessel and having a robotic arm with a plurality of arm sections comprising, a mounting frame, a first arm section mounted on said mounting frame for rotational and longitudinal movement to define an axis of compound motion including a first rotational axis of motion and a second longitudinal axis of motion, a second arm section, means pivotally interconnecting said first and second arm sections to define a pivotal third axis of motion, a third arm section, means rotationally interconnecting said second and third arm sections to define a rotational fourth axis of motion, a fourth arm section, means pivotally interconnecting said fourth arm section to said third arm section to define a fifth axis of motion, a fifth arm section, means rotationally interconnecting said fourth and fifth arm sections, releasable means on said fifth arm section for holding an end effector, a mounting tube positionable within and connected to said nuclear vessel at the top and bottom thereof and of a size to receive said robotic arm therein, and said mounting tube having a window in the wall thereof to permit said second, third, fourth and fifth arm sections to move outwardly of the mounting tube by pivotal movement about said third axis of motion.

4. A robotic system as defined in claim 3 including bearing means on the first arm section engaging the interior of said mounting tube for guiding the movement of the first arm section.

5. A robotic system having an arm for positioning an end effector within a nuclear vessel and insertable within a relatively small diameter tube at the top of the vessel comprising, a mounting tube for positioning in fixed relation with the nuclear vessel, a mounting frame longitudinally fixed to the mounting tube at an end thereof positionable outside the nuclear vessel, a plurality of arm sections in movably-connected end-to-end relation extending lengthwise of the mounting tube, means connected between said mounting frame and the first of the arm sections for moving the arm sections lengthwise of the mounting tube, means for rotating the first arm section relative to the mounting tube, a plurality of the arm sections having coacting driven means therebetween for moving one arm section relative to another, a plurality of selectively operable drive motors mounted for movement with said first arm section, and means for transmitting motion from the drive motors to said driven means for causing one arm section to move relative to another.

6. A robotic system as defined in claim 5 wherein said arm sections are tubular and said motion-transmitting means extend lengthwise and internally of said arm sections.

7. A robotic system as defined in claim 5 including a gearbox fixed to said first arm section, a plurality of means in said gearbox for converting rotation to rotary movement of said motion-transmitting means, and said plurality of selectively operable drive motors individually connected to the input of the rotation-converting means.

8. A robotic system as defined in claim 5 wherein said arm sections include an arm section at an operating end of the robotic arm having remotely-operable means for holding an end effector.

9. A robotic system as defined in claim 8 including a plurality of arm sections intermediate said first arm section and the arm section at the operating end, and the movable connections between arm sections including means to provide pivotal movement between two arm sections and rotational movement between two arm sections.

10. A robotic system as defined in claim 5 including a second arm section, means pivotally interconnecting said first and second arm sections, and said motion-transmitting means including shafts extending lengthwise of said pivotal interconnection with flex shaft sections in said shafts at the location of said pivotally interconnecting means.

11. A robotic arm having a plurality of arm sections comprising a first arm section, means for moving said first arm section along a first axis extending lengthwise thereof, means for rotating said first arm section about said first axis which constitutes a first roll axis, a second arm section, means pivotally interconnecting said first and second arm sections for pivoting of the second arm section about a pitch axis, a third arm section, means rotatably interconnecting said second and third arm sections for rotation of the third arm section about a second roll axis extending lengthwise of the second and third arm sections, a fourth arm section, means pivotally interconnecting said fourth arm section to the third arm section for pivoting of the fourth arm section about a yaw axis extending transversely to said third roll axis, a fifth arm section having means for holding an end effector, means interconnecting said fourth and fifth arm sections for rotation about a third roll axis extending lengthwise of the fourth arm section, and selectively operable drive means for achieving movement along or about one or more of said axes comprising a plurality of servo motors and said servo motors are all located adjacent and connected for movement with the upper end of said first arm section.

12. A robotic arm as defined in claim 11 wherein said selectively operable drive means includes a plurality of motion-transmitting shafts extending through said arm sections.

13. A robotic arm defined in claim 12 wherein said selectively operable drive means includes gearing between arm sections operable to cause movement about said pitch axis, said yaw axis and said second and third roll axes, and said motion-transmitting shafts connected one to each of the gearing between arm sections.

14. A robotic system comprising, a torque housing, a mounting tube extended through said torque housing, a robotic arm with a plurality of movably interconnected arm sections with at least one arm section movably mounted within the mounting tube, a mounting frame rotatably supported by the torque housing, means connecting an upper end of the mounting tube to said mounting frame, a gearbox movable along said mounting frame at a location above the upper end of the mounting tube, a first of said arm sections extending above the upper end of the mounting tube, means connecting an upper end of said first arm section to said gearbox, drive means connected between said mounting frame and gearbox for moving said gearbox and first arm section lengthwise of the mounting frame and the mounting tube along a first axis of motion, and drive means for rotating said mounting frame including a motor supported by said torque housing for rotating the mounting tube and first arm section about a second axis of motion coincident with said first axis of motion.

15. A robotic system for work access to the interior of a nuclear vessel through a small diameter opening thereto comprising, a torque housing mountable onto the nuclear vessel externally of said opening, a mounting tube extended through said torque housing and of a length to extend into and adjacent the bottom of the nuclear vessel, a robotic arm with a plurality of movably interconnected arm sections movably mounted within the mounting tube, a mounting frame rotatably supported by the torque housing, means connecting an upper end of the mounting tube to said mounting frame, a gearbox carried by said mounting frame at a location above the upper end of the mounting tube, a first of said arm sections extending above the upper end of the mounting tube, means connecting an upper end of said first arm section to said gearbox, means mounting said gearbox for movement longitudinally of the mounting frame, drive means connected between said mounting frame and gearbox for moving said gearbox and first arm section lengthwise of the mounting frame and the mounting tube along a first axis of motion, and drive means for rotating said mounting frame including a motor supported by said torque housing for rotating the mounting tube and first arm section about a second axis of motion.

16. A robotic system as defined in claim 15 wherein said mounting tube has an opening in the wall defining a window through which a plurality of said arm sections can be extended toward a wall of a nuclear vessel.

17. A robotic system as defined in claim 16 wherein said plurality of arm sections have gear means therebetween rotatable to cause movement of one arm section relative to another, a plurality of motors on said gearbox, and drive shafts from said motors to said gear means.

18. A robotic system for work access to the interior of a nuclear vessel through a small diameter opening thereto comprising, a torque housing mountable onto the nuclear vessel externally of said opening, a mounting tube extended through said torque housing and of a length to extend into and adjacent the bottom of the nuclear vessel, a robotic arm with a plurality of movably interconnected arm sections movably mounted within the mounting tube, said mounting tube having an opening in the wall thereof defining a window through which a plurality of said arm sections can be extended toward a wall of the nuclear vessel, a mounting frame rotatably supported by the torque housing, means connecting an upper end of the mounting tube to said mounting frame, a gearbox carried by said mounting frame at a location above the upper end of the mounting tube, a first of said arm sections extending above the upper end of the mounting tube, means connecting an upper end of said first arm section to said gear box, means mounting said gearbox for movement longitudinally of the mounting frame, drive means connected between said mounting frame and gearbox for moving said gearbox and first arm section lengthwise of the mounting frame and the mounting tube along a first axis of motion, drive means for rotating said mounting frame including a motor supported by said torque housing for rotating the mounting tube and first arm section about a second axis of motion, and gear means between said plurality of arm sections rotatable to cause movement of one arm section relative to another, a plurality of motors on said gearbox, and drive shafts from said motors to said gear means.

19. A robotic system having a robotic arm for work access to the interior of a nuclear vessel and having an operating end for holding an end effector to perform a desired operation within the nuclear vessel and a control end positionable externally of the nuclear vessel comprising, a plurality of cylindrical arm sections positioned generally in end-to-end relation, means on an arm section at the operating end of the robotic arm for holding an end effector, means mounting said arm sections to enable six axes of motion of the operating end of the robotic arm with a plurality of said axes of motion being between arm sections disposed in the nuclear vessel during operation of the robotic arm, means between arm sections operable to effect said plurality of axes of motion, a plurality of motors at the control end of the robotic arm for positioning outside of the nuclear vessel for providing power to said means between arm sections for moving said arm sections to achieve said six axes of motion, drive trains between certain of said motors and said means between arm sections to cause movement about said plurality of axes of motion, a mounting tube positionable within the nuclear vessel and supported thereby at the opposite ends thereof, said robotic arm being positioned within the mounting tube for guided longitudinal and rotational movement, and means defining a window in the wall of the mounting tube at a location to permit a plurality of said arm sections to extend therethrough.

20. A robotic system as defined in claim 19 wherein two of said axes of motion include movement of the robotic arm longitudinally and rotationally with respect to the mounting tube with a third axis of motion being about an axis transverse of the length of the mounting tube, and said window having a height to enable arm sections to move outwardly of the window about said third axis in a plurality of positions of the robotic arm longitudinally of the mounting tube.

* * * * *